B. F. GREEN.

Improvement in Potato-Diggers.

No. 130,125.  Patented Aug. 6, 1872.

Witnesses:
F. A. Morley
Peter McAnnell

Inventor:
B. F. Green

UNITED STATES PATENT OFFICE.

BENJAMIN F. GREEN, OF SYRACUSE, NEW YORK.

IMPROVEMENT IN POTATO-DIGGERS.

Specification forming part of Letters Patent No. 130,125, dated August 6, 1872.

Specification describing an Improved Potato-Digger, invented by BENJAMIN F. GREEN, of Syracuse, in the county of Onondaga and State of New York.

This invention relates to a machine composed of circular potato-forks mounted on a sled or frame-work, the circular forks being suspended obliquely to the line of motion, and rotated by contact of the lower tines with the ground as the sled progresses, as hereinafter more fully described. The invention consists in the peculiar construction of the forks and their combination with means for adjustment, as hereinafter described.

Figure 1:
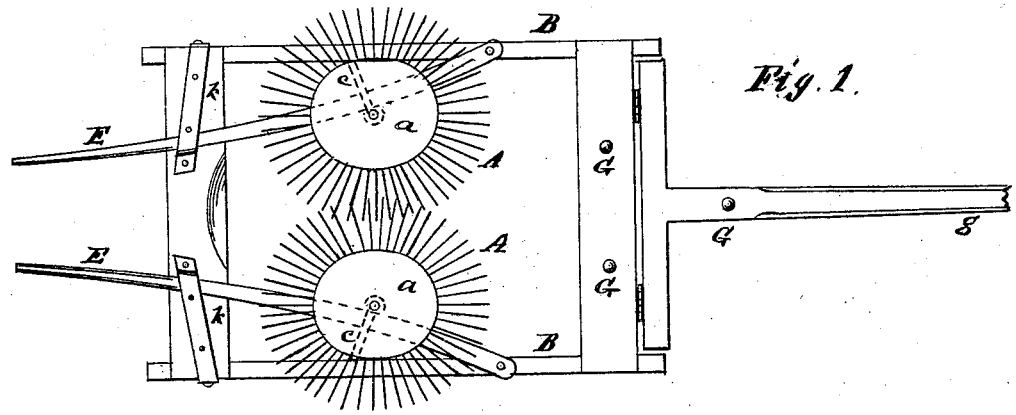
Figure 2:
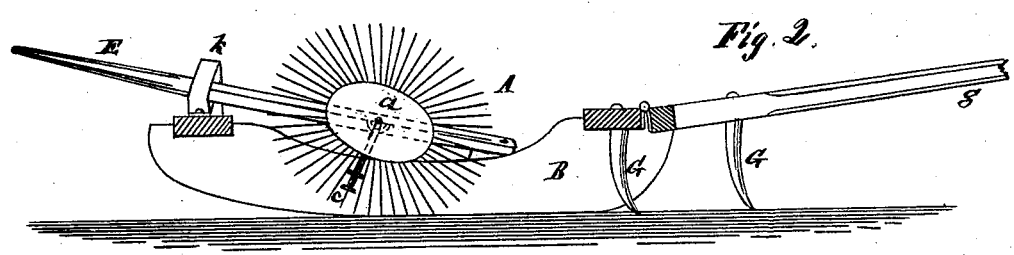
Figure 3:
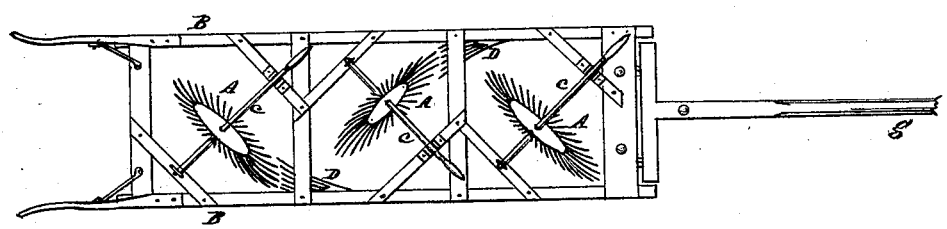

Figure 1 is a top view or plan, and Fig. 2 is a sectional side view. Fig. 3 shows a modification.

Similar letters of reference indicate like parts in the several figures.

A A are circular potato-forks, the tines forming a complete circle around the center-piece $a$. These forks are mounted on a frame-work or sled, B B. Each fork has a shaft, $c$, and the lower ends of these shafts rest in sockets or bearings on the sled-runners B, as shown at $c$, Fig. 2, and the upper ends of the shafts $c$ are held in bearings that are attached to the movable levers E E, so that by spreading the rear ends of these levers the forks are thrown up out of the ground, and vice versa. The levers E are pivoted to the frame-work at their forward ends, and their rear ends are held in racks $k\ k$.

The ground is broken up ahead of the forks by cultivator-teeth G, the front tooth being set in the tongue $g$. As the machine is drawn forward the tines of the forks engage with the ground, passing under the potatoes, and cause the forks to rotate, so that what dirt does not pass between the tines at first is taken up with the potatoes and carried to the rear side of the forks, where the separating movement of the tines causes the dirt and potatoes to fall across the tines sufficiently to riddle the potatoes from the dirt that is taken up by the forks. The runners B B are made somewhat rocker-shape on the bottom, so that when the teeth G become fouled with weeds or vines they can be lifted sufficiently to clear them by the operator throwing his weight on the projecting rear ends of the levers E. The vines pass through the forks with their rotation, and drop off clear where the tines of the fork separate.

Fig. 2 shows a modification, in which the rotary forks alternate and are set at a different angle. The shafts in this case extend from both sides of the fork or wheel, and the front ends of the shafts $c$ rest in open boxes that extend upward, so that each fork or wheel is elevated from the ground by taking hold of the handle on the front end of the shaft and lifting it into an elevated rest. The depth of the digging is also regulated by vertical adjustment of one or both of the boxes of said shaft $c$. A deflector, D, can be used for the rear wheels, to prevent unscreened dirt from passing between the runner and the leading edge of the wheel or fork.

I claim—

The rotary forks, composed of a center-piece and radial tines, in combination with a sled or frame and adjusting levers or shafts, arranged to move the forks both laterally and vertically, all operating substantially as herein described.

The above specification of my invention signed by me this 19th day of June, 1872.

B. F. GREEN.

Witnesses:
    F. A. MORLEY,
    PETER MCANDREW.